(12) United States Patent
De' Longhi (10) Patent No.: US 10,856,696 B2
(45) Date of Patent: Dec. 8, 2020

(54) APPARATUS FOR COOKING FOODS

(71) Applicant: DE' LONGHI APPLIANCES S.R.L. CON UNICO SOCIO, Treviso (IT)

(72) Inventor: Giuseppe De' Longhi, Treviso (IT)

(73) Assignee: DE' LONGHI APPLIANCES S.R.L. CON UNICO SOCIO, Treviso (IT)

( * ) Notice: Subject to any disclaimer, the term of this patent is extended or adjusted under 35 U.S.C. 154(b) by 129 days.

(21) Appl. No.: 15/735,953

(22) PCT Filed: Jun. 10, 2016

(86) PCT No.: PCT/IB2016/053435
§ 371 (c)(1),
(2) Date: Dec. 12, 2017

(87) PCT Pub. No.: WO2016/199087
PCT Pub. Date: Dec. 15, 2016

(65) Prior Publication Data
US 2018/0184848 A1    Jul. 5, 2018

(30) Foreign Application Priority Data

Jun. 12, 2015  (IT) .......................... 102015000023336

(51) Int. Cl.
*A47J 43/07*       (2006.01)
*A47J 27/00*       (2006.01)
(Continued)

(52) U.S. Cl.
CPC ......... *A47J 43/0722* (2013.01); *A47J 27/004* (2013.01); *A47J 36/06* (2013.01);
(Continued)

(58) Field of Classification Search
CPC ........ A47J 27/004; A47J 36/06; A47J 43/046; A47J 43/0722; B01F 2215/0026;
(Continued)

(56) References Cited

U.S. PATENT DOCUMENTS 1,426,118 A  *  8/1922  Sonsthagen .............. A23G 1/10
                                                           241/98
2,573,837 A  *  11/1951  Fox ........................ A47J 36/165
                                                           366/311
(Continued)

FOREIGN PATENT DOCUMENTS

DE    10 2007 056711 A1    5/2009
DE    10 2010 036403 A1    1/2012
(Continued)

OTHER PUBLICATIONS

Machine Translation EP 1923128, EPO machine Translation (Year: 2008).*

(Continued)

*Primary Examiner* — Tony G Soohoo
(74) *Attorney, Agent, or Firm* — Marshall, Gerstein & Borun LLP (57) ABSTRACT

Apparatus for cooking foods includes an external container, an internal container, open at the top, a heating device and a rotating mixing device. The mixing device is selectively removable and comprises at least one mixing blade driven by the rotation motion.

30 Claims, 8 Drawing Sheets

(51) Int. Cl.
A47J 36/06 (2006.01)
A47J 43/046 (2006.01)
B01F 7/00 (2006.01)
B01F 7/20 (2006.01)

(52) U.S. Cl.
CPC ........... *A47J 43/046* (2013.01); *B01F 7/0005* (2013.01); *B01F 7/00208* (2013.01); *B01F 7/00275* (2013.01); *B01F 7/20* (2013.01); *B01F 2215/0026* (2013.01)

(58) Field of Classification Search
CPC ................ B01F 7/0005; B01F 7/00208; B01F 7/00275; B01F 7/20
See application file for complete search history.

(56) References Cited

U.S. PATENT DOCUMENTS

| | | | | |
|---|---|---|---|---|
| 2,753,162 | A * | 7/1956 | Conley | B44D 3/06 |
| | | | | 416/175 |
| 3,884,135 | A * | 5/1975 | Lohr | A47J 27/14 |
| | | | | 99/348 |
| 4,643,583 | A * | 2/1987 | Cecchini | A23G 9/106 |
| | | | | 366/149 |
| 5,056,926 | A * | 10/1991 | Bouheben | B01F 7/00166 |
| | | | | 366/102 |
| 5,419,633 | A * | 5/1995 | Lorenzetti | B28C 5/163 |
| | | | | 366/192 |
| 6,499,391 | B1 * | 12/2002 | Su | A23N 12/10 |
| | | | | 99/339 |
| 7,993,694 | B2 * | 8/2011 | Goderiaux | A47J 36/165 |
| | | | | 426/438 |
| 9,498,083 | B2 * | 11/2016 | Goderiaux | A47J 36/165 |
| 2002/0027175 | A1 * | 3/2002 | Capp | A47J 43/046 |
| | | | | 241/199.12 |
| 2005/0223906 | A1 | 10/2005 | Xu et al. | |
| 2008/0134905 | A1 * | 6/2008 | Peng | A47J 43/0722 |
| | | | | 99/348 |
| 2010/0303986 | A1 * | 12/2010 | De' Longhi | A47J 37/1209 |
| | | | | 426/438 |
| 2012/0145140 | A1 * | 6/2012 | Chang | A47J 37/0641 |
| | | | | 126/19 R |
| 2014/0000462 | A1 * | 1/2014 | Payen | A47J 37/1209 |
| | | | | 99/348 |
| 2017/0360237 | A1 * | 12/2017 | Ohta | A47J 27/00 |
| 2018/0344090 | A1 * | 12/2018 | Cox | A47J 43/085 |

FOREIGN PATENT DOCUMENTS

| | | | | |
|---|---|---|---|---|
| EP | 1923128 | A2 * | 5/2008 | ......... A47J 43/0722 |
| EP | 2394549 | A2 * | 12/2011 | ......... A47J 43/0722 |
| EP | 2460452 | A1 * | 6/2012 | ......... A47J 43/0722 |
| EP | 2520205 | A1 * | 11/2012 | ............ A47J 43/046 |
| EP | 2 651 271 | A1 | 10/2013 | |
| EP | 3342316 | A4 * | 7/2018 | .............. A47J 27/00 |
| GB | 2544967 | A * | 6/2017 | ......... A47J 43/0722 |
| WO | WO-2017089828 | A1 * | 6/2017 | ......... A47J 43/0722 |

OTHER PUBLICATIONS

WIPO document application JP 2017-12693 (Year: 2017).*
International Search Report and Written Opinion for PCT/IB2016/053435, dated Aug. 19, 2016.

* cited by examiner

Sez. IV-IV

Sez. VI-VI    Sez. V-V

Sez. VII-VII    Sez. VIII-VIII    Sez. IX-IX

Sez. X-X

Sez. XI-XI

Sez. XII-XII

Sez. XIII-XIII

Sez. XVI-XVI    Sez. XVII-XVII

Sez. XVIII-XVIII    Sez. XIX-XIX

Fig. 21

APPARATUS FOR COOKING FOODS

FIELD OF THE INVENTION

The present invention concerns an apparatus for containing foods and for executing in them a cooking process through heating. The apparatus cooks the foods, reproducing in them the normal mixing process that the chef performs manually.

The apparatus according to the invention provides an external container and a removable lid, and includes heat energy production means and possible means for transferring the heat energy to the foods.

In particular, in order to reproduce the chef's action, the cooking apparatus provides that in a container for foods, inside the external container, there is a mixing blade so that the reciprocal movement of the container and blade reproduces the action of the chef.

The apparatus according to the invention can provide the container rotating and the blade fixed, in which case the blade will be anchored peripherally, for example to the external container or to the center, or it can provide the container fixed and the blade rotating.

Hereafter, to simplify the description, we will refer mainly to a fixed container and a rotating blade.

The present invention can be applied both to cooking with an abundant quantity of cooking liquid, which can be oil or other fatty material, alone or with water substances, and also to cooking with a minimum quantity of oil or fatty material.

BACKGROUND OF THE INVENTION

It is known that in the home cooking apparatuses that have been developed over the years have led to the production of cooking apparatuses that are intended to optimize the times needed for preparing recipes, with the purpose of making certain steps automated, eliminating human intervention as much as possible, but at the same time reproducing as far as possible the optimum cooking conditions obtains by chefs.

It is known that those using cooking apparatuses can let the apparatus perform the cooking step by setting certain parameters that depend on the type of food, quantity, type of cooking and the result to be obtained, which parameters condition every function of the apparatus.

It is known that cooking apparatuses according to the present invention are very versatile as they allow to obtain a plurality of recipes based on the type of food, the combination of the foods and the particular cooking methods adopted.

It is also known that in recent years research and development studies have focused attention on cooking apparatuses which, in a substantially protected environment, allow to execute a great variety of recipes.

It is known that in order to obtain cooking apparatuses with the characteristics described above, and which allow to obtain particular desired results, it is necessary to provide a heating device to suitably convey the heat toward the food, said device able to include electric resistances, induction heat sources, irradiation, etc. The vehicle that generates the heat can be extremely varied, and also the system to transfer the heat thus generated to the food in the desired conditions can also be extremely varied.

Furthermore, it is known that in an apparatus of the type in question here, there must be a mixing device which, in cooperation with the container, allows to move the food so as to prevent the food from sticking on the bottom of the container, that is, to correctly introduce the food to the heat affecting it.

It is in fact known from the state of the art that to be homogeneously cooked the food has to have an efficient exposure of all its surfaces to the source of heat, and also to the vehicle that carries the heat in the container.

Moreover, the mixing action must guarantee the integrity of the food, also in order to confer a pleasant aspect for the final presentation.

One disadvantage in the state of the art is that current mixing devices are not versatile, that is, they are not suitable for cooking a wide range of foods. Indeed, with mixing blades as currently known, some types of food, due to their size, consistency, density or grain size, can be cooked dis-homogeneously and/or are broken up and/or laminated by the device that effects the mixing.

Known cooking apparatuses are therefore at most suitable for cooking specific and determinate ranges of foods.

In the state of the art, for example with foods formed by distinct and separate bodies, or with foods that tend to aggregate and that remain as such during the whole cooking phase, it is necessary to adopt different conformations of the mixing device to allow the correct mixing of the food.

Document US-A-2005/0223906 describes a cooking apparatus comprising a container inside which a mixing blade is disposed, in which the mixing blade comprises an approach edge that delimits a surface for at least partly lifting the food.

The purpose of the present invention is to obtain a mixing device for cooking apparatuses configured so as to be suitable to mix homogeneously a wide range of foods to allow to execute a plurality of recipes.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purpose, an apparatus is provided for cooking foods, which can comprise an external protective container of the openable type, an extractable internal container for food, open at the top, a lid, a heating device connected to a possible mean to transfer the heat generated, and a mixing device comprising at least a mixing blade, also extractable.

As indicated, the internal container can be fixed or rotating, in which case the mixing blade will be respectively rotating or fixed.

We will now illustrate, by way of example, only the case of a fixed internal container and a rotating mixing blade. It is within the capacity of the person of skill to make the opposite embodiment, having understood the spirit of the invention. Providing the mixing blade rotating, it can be motorized by a drive member present in a lid or under the internal container, or above the internal container.

On the contrary, providing the mixing blade fixed, it will be connected to the lid or to the wall of the external container that contains the internal container, or anchored to a suitable pin located in the central part of the rotating internal container.

In this latter case the rotating internal container will have a suitable ridge around the pin, to prevent leakage of food or liquids and possibly the connection of the mixing blade will provide a cover for the ridge, to promote a greater seal thereof.

In a variant, the mixing blade can be connected fixedly to the connection mean of the mixing device, or can be selectively removable.

According to the invention, the internal container can be horizontal or have its median axis inclined.

Again according to the invention, the internal container can have a substantially flat base wall, or conical, or more or less humped.

Hereafter, for the sake of simplification, we will refer to a flat base wall, at least roundly connected with at least the lateral wall.

In correspondence with the external periphery of the internal container, the mixing device, whether fixed or rotating, can be either rounded, when the characteristic of the food is such that there is no risk of breakdown and/or lamination between the mixing blade and the periphery of the internal container, or provide a development such as to prevent any breakdown and/or lamination.

In this case, by "lamination" and "breakdown" we mean that the mixing blade does not perform its function of translation, lifting, upending and redistribution, but produces breakages or crushing of the food, or part of the food, by the blade in cooperation with the base wall or the lateral wall of the internal container. Thanks to the particular configuration of the mixing blade it is possible to prevent the lamination and/or breakdown effect when the food to be mixed is easily breakable.

In the case described hereafter of the rotating mixing device, it comprises at least a mixing blade and a connection mean, to which the blade is connected, driven by a drive member.

The connection mean and drive member will be associated on each occasion with the lid or a suitable support structure, or with the internal container. If associated with the internal container, the connection mean will cooperate with the median axis, hence central to the internal container, and the internal container, and possibly the connection of the mixing blade will have a conformation that prevents the leakage of liquid.

The mixing device is advantageously selectively removable and in the case of a rotating mixing blade it can be made to rotate with different ranges of speed, either continuously or intermittently.

Furthermore, the rotation of the mixing blade can be anticipated or postponed with respect to the transmission of heat, and can have a constant or variable or intermittent speed.

Applicant has found that the blade gives a homogeneous result if it is able to move the food from the periphery to the center and at the same time is able to redistribute it on the base of the internal container. In this sense, the approach edge, which cooperates with the periphery of the internal container, can include means that also clean part of the internal surface of the lateral wall of the internal container.

According to the needs to move the food, in relation to the point where it contacts the food, the blade has an edge that helps the food to rise from the bottom, or base wall, of the internal container for foods.

According to the invention, after the approach edge the food meets a slope that lifts it further. The slope can be constant or vary along the profile of the blade, rising toward the center of rotation, or toward the center of the internal container for foods.

According to the invention, the approach edge can be disposed radial.

According to a variant, the approach edge is conformed to induce in the food a movement from the periphery to the center and can have a helical or spiral configuration.

The part of the mixing blade that is situated after the approach edge has a development that is flat, or substantially flat, toward the periphery of the internal container, and then has an articulated development as it is gradually displaced toward the center.

This development will advantageously provide a conformation such that the food, as it moves toward the center, will rise more and more from the base of the internal container.

The exit edge, at least for one segment, can have a substantially constant height.

According to a variant, the exit edge has a progressively increasing height from the periphery toward the center of the internal container.

According to another variant, the exit edge has a progressively and continuously increasing height from the periphery toward the center of the internal container.

According to another variant, the exit edge has a progressively increasing height with at least a concavity and a convexity from the periphery toward the center of the internal container.

According to another variant, the exit edge has a plurality of depressions, at least two, rounded to make some foods flow away between the ridges or emerging parts, and possibly to oblige the food to move its circumferential position.

According to a variant, the terminal part of the blade, that is, the part nearest the center of the internal container, has a development like a turnwrest plowshare, so that the food not only rises but is led to overturn. Consequently, when it falls back onto the base wall or bottom of the internal container, it no longer presents the same side as when it was lifted by the blade, but has at least partly overturned.

The present invention also concerns a method for mixing foods, which uses a mixing device as described above, which provides:
  a continuous translation of at least part of the food according to an at least partial migration on the mixing blade toward the center of the internal container;
  a redistribution of said part of the food on the base of the internal container;
  a lifting of all the food by means of the approach edge;
  an at least partial action of upending the food at least in the last quarter of the mixing blade toward the center of the internal container.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We shall now refer in detail to the various embodiments of the present invention, of which one or more examples are shown in the attached drawing. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

According to the present description, the invention concerns a cooking apparatus for foods 10 for a wide variety of foods, for example potatoes, vegetables, but not only, also rice, cereals in general, pasta, soups, couscous, meat, fish, whether fresh or frozen.

Furthermore, the cooking apparatus for foods 10 is able to perform different kinds of cooking, for example stews, brazing, boiling, roasting, frying, simple heating, sautéing, browning, slow or rapid cooking in general.

The apparatus for cooking foods 10 can be used for cooking with a certain quantity of cooking liquid, which can be oil or other fatty material, and also for cooking with a minimum quantity of oil or fatty material.

Figure 3:
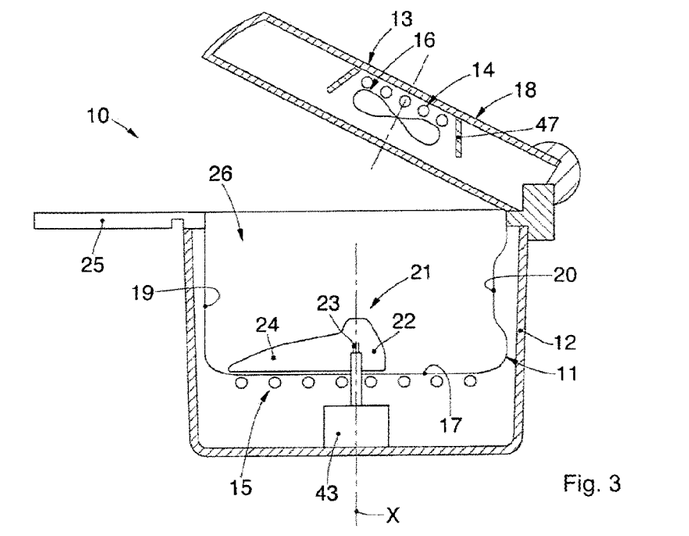
FIG. 3 is a schematic section of an apparatus for cooking food.
Figure 4:
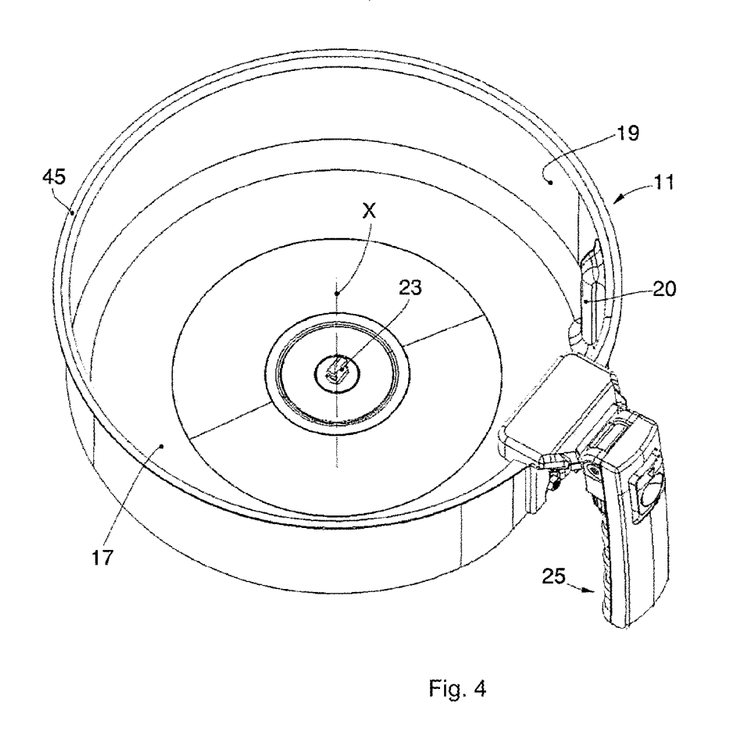
FIG. 4 is a perspective view of an internal container for food in an apparatus for cooking food.

With reference to FIGS. 3 and 4, the cooking apparatus for foods 10 can comprise an external container 12.

In a variant embodiment, the external container 12 can be opened at its top by a lid 18.

The presence of the lid 18 is intended to create a protected space with the conditions needed to cook the foods.

Moreover, the lid 18 can be made of the same material as the external container 12, or a material that allows to have substantial transparency and resistance to high temperatures to allow the user to control the cooking.

For example, the lid 18 can be made of polymer material or glass.

The cooking apparatus for foods 10 also comprises an internal container 11 able to contain foods that are in different shapes, for example polyhedral, or rounded, and different consistency (liquid or solid or intermediate, for example a risotto or a soup) and different sizes, for example pieces with a big or small section.

The internal container 11 is delimited by a base wall 17, which in this case, non-restrictively, is substantially circular, and a lateral wall 19.

The internal container 11 comprises an external upper edge 45 that is substantially a continuation of the lateral wall 19.

The apparatus for foods 10 comprises a mixing device 21.

The mixing device 21 comprises at least one mixing blade 24 and a connection mean 22.

The mixing device 16 can be rotatable by means of a drive member 43, or fixed.

The variant embodiments described hereafter are valid both for fixed mixing blades 24 and also rotating ones.

In the variant embodiments described hereafter, the mixing blade 24 has a terminal connection 34 toward the periphery of the internal container 11.

Depending on the cases, the terminal connection 34 is configured to prevent the disgregation and/or lamination of the food.

Figure 1A:
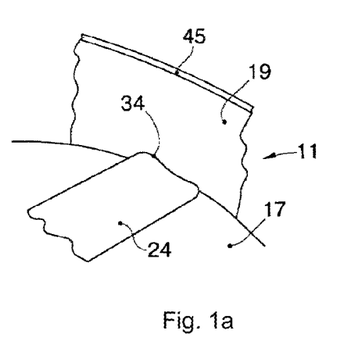
FIGS. 1a, 1b and 1c show some forms of the mixing blade in cooperation with the external upper edge of the internal container for food.

In the variant shown in FIG. 1a, the mixing blade 24 has a terminal connection 34 configured so that it does not cause the disaggregation and/or lamination of the food.

Disgregation and/or lamination occurs for example with foods characterized by small grains, such as for example, but not only, rice or small pasta, or vegetables or cereals, etc.

The effect of disgregation and/or lamination is prevented by reducing to a minimum the space between the terminal connection 34 and the lateral surface 19 of the internal container 11.

Figure 1B:
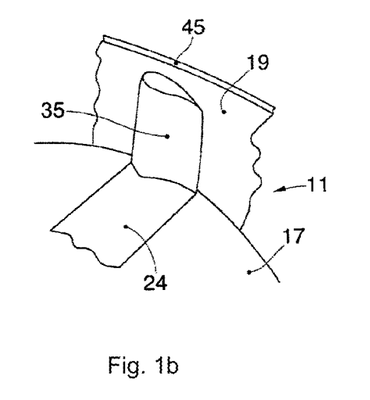

In the variant shown in FIG. 1b, the terminal connection 34 can cooperate with a peripheral cleaner 35. The peripheral cleaner 35 can be made so as to have a pointed surface, very tapered in the direction in which it first impacts on the food, in the case where it is the mixing blade 24 that rotates, or the internal container 11 rotates.

The peripheral cleaner 35 has a development in height that goes from the terminal connection 34 until almost in correspondence with the external upper edge 45.

The peripheral cleaner 35 allows to separate the food from the lateral wall 19 of the internal container 11 and to direct the food toward the mixing blade 24.

Figure 1C:
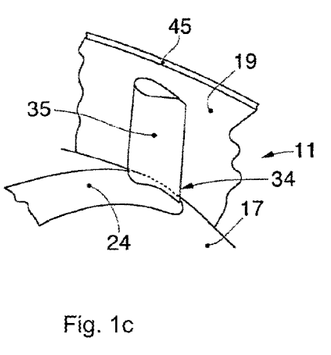

In the variant shown in FIG. 1c, a mixing blade 24 is provided configured so as to have a terminal connection 34, for example rounded. The rounded terminal connection 34 cooperates with the peripheral cleaner 35.

Figure 2:
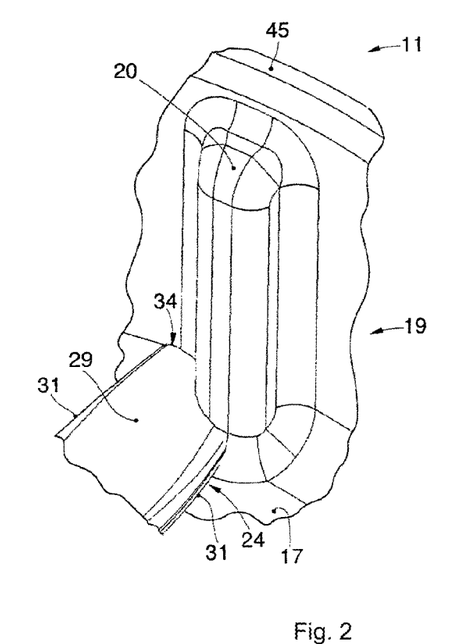
FIG. 2 is a detailed view of the internal container for food in a variant embodiment.

In another variant shown in FIG. 2, at least one stirrer 20 can be provided, fixed or applicable on the periphery of the internal container 11. The stirrer 20 cooperates with the mixing blade 24 to mix the food better.

The internal container 11 is advantageously open on its top, to be able to introduce the food inside it. Moreover, the internal container 11 is selectively removable from the external container 12.

The internal container 11 has a median axis X that can be inclined with respect to a median axis of the external container 12.

In a variant embodiment, to which we will refer hereafter, the median axis X is substantially in correspondence with the median axis of the external container 12, that is, the internal container 11 is in a horizontal position.

The base wall 17 can have a surface made with a plurality of configurations, for example conical, or with a more or less humped shape.

In a preferred variant embodiment, to which we will refer hereafter, the base wall 17 assumes a substantially flat configuration, and at least roundly connected to the lateral wall 19.

The internal container 11 can define a cooking chamber 26 selectively openable/closable by the lid 18.

The food is progressively cooked inside the cooking chamber 26.

The apparatus for cooking food 10 comprises a heating device 13 on the side facing toward the cooking chamber 26.

In a particular variant embodiment, the heating device 13 can comprise at least one heating element 14, 15.

In a particular variant embodiment, the heating device 13 can comprise two heating elements, an upper heating element 14 and a lower heating element 15.

Hereafter, the term "upper" means an element located laterally to the internal container 11, or on the top, that is, in correspondence with the aperture of the internal container 11. In the same way, the term "lower" means an element located below the base wall 17 of the internal container 11.

The heating elements, upper 14 and lower 15, can be tubular electric resistances, or resistive bands or wires, or induction resistances, able to generate heat and to convey it through induction and/or radiation.

The upper heating element 14 can be located in correspondence with the internal side of the lid 18 and advantageously facing toward the food contained inside the internal container 11.

The upper heating element 14 can be connected to a mean to transfer the heat generated 16.

At least one of either the upper heating element 14 or the mean to transfer the heat generated 16 is installed in correspondence with the lid 18.

In a variant embodiment, the upper heating element 14 and the mean to transfer the heat generated 16 can be installed in correspondence with the lateral wall 19.

The mean to transfer the heat generated 16 allows to distribute the heat generated by the upper heating element 14 uniformly inside the cooking chamber 26.

In another variant embodiment, a deflector element 47 cooperates with the upper heating element 14 and the mean to transfer the heat generated 16 to convey the heat generated toward the food.

The lower heating element 15 can be disposed near the base wall 17, that is, immediately under the internal container 11. In this way, the food is also cooked in the part below the internal container 11.

The internal container 11 can be made of metal material, for example an aluminum alloy, or stainless steel or a plastic material resistant to high temperatures.

Furthermore, the internal container 11 can be covered with any other material suitable to contrast any possible adherence of the food to the base wall 17 and the lateral wall 19.

Merely by way of example, the internal container 11 can be coated with PTFE (polytetrafluoroethylene), ceramic material or an enamel.

In a particular variant embodiment the internal container 11 can comprise at least a handle 25 suitable to facilitate the operation to extract the internal container 11 from the external container 12. The handle 25 can be attached to the internal container 11 by screws or rivets, or clamped in snap-in mode.

The internal container 11, depending on the configuration assumed, can contain inside it a quantity of food from 1 kg to 5 kg.

In correspondence with the base wall 17 and coaxial to the median axis X, the internal container 11 can comprise a coupling element 23.

The mixing device 21 is inserted inside the cooking chamber 26 and is selectively removable.

According to the variant embodiments shown in FIGS. 5, 6, 8, 9, 11, 12, 14, 15 and 17, the mixing blade 24 can be connected to the connection mean 22.

Figure 5:
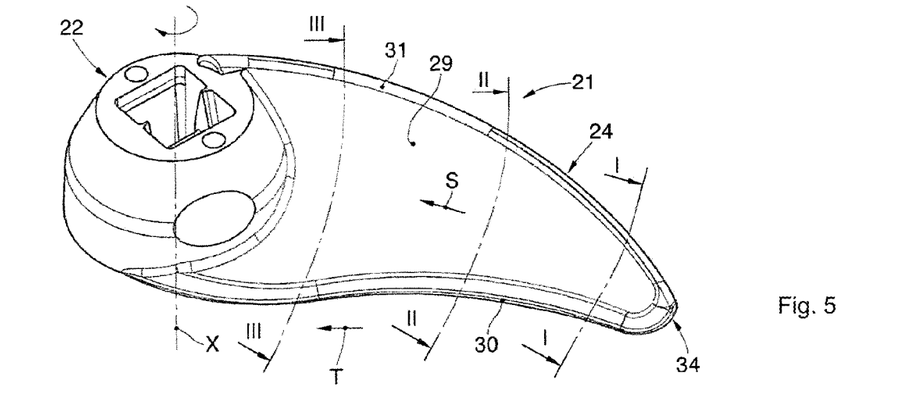
FIG. 5 is a perspective view of a mixing device according to embodiments described here.
Figure 6:
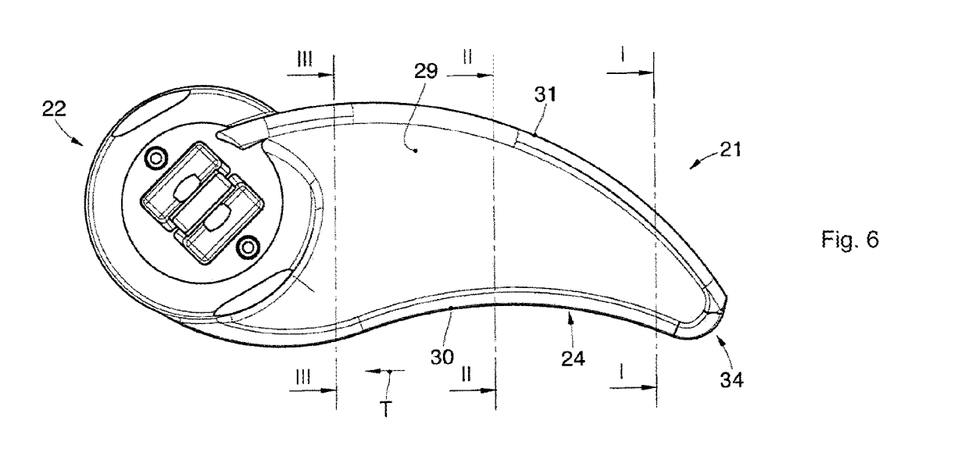
FIG. 6 is a view from above of a mixing device according to embodiments described here.
Figure 7:
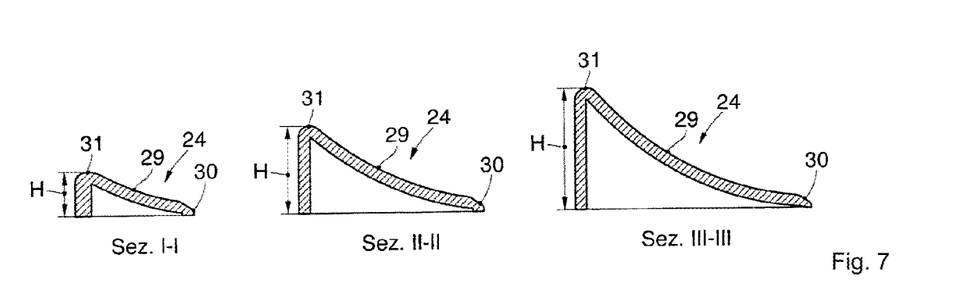
FIG. 7 is a lateral view in section of a mixing blade according to embodiments described here.

In a variant embodiment, the mixing blade 24 can be connected fixed to the connection mean 22.

In another variant embodiment, the mixing blade 24 can be selectively removable from the connection mean 22.

In a variant embodiment, the connection mean 22 can be coaxial with the axis X of the internal container 11 (FIG. 3).

The connection mean 22 is configured to connect advantageously with the coupling element 23.

Merely by way of example, the coupling can be screw, bayonet, hook, or snap-in type, or any other type suitable for the purpose.

The mixing blade 24 can be configured so as to be adequate for the different cooking requirements of specific foods.

A drive member 43 can be coupled with the mixing device 21 to allow it to rotate.

In a variant embodiment shown in FIG. 3, the drive member 43 can be installed under the internal container 11.

In another variant embodiment, the drive member 43 can be installed under the lid 18 and above the internal container 11.

In some variant embodiments, another drive member is provided (not shown in the drawings) which can allow the internal container 11 to rotate.

The rotation movement of the mixing device 21 can have a speed from 1 rev/min to 10 revs/min, in particular from 1 rev/min to 4 rev/min.

In a particular variant embodiment, in accordance with the previous variants, the internal container 11 is fixed and the mixing device 21 rotates.

In another variant embodiment, the internal container 11 rotates and the mixing device 21 is fixed.

In this particular variant the mixing blade 24 can be connected directly to the lid 18.

In another variant the mixing blade 24 can be attached to the surface of the external container 12.

In another variant the mixing blade 24 can be attached in correspondence with the median axis X to the rotating internal container 11. In this case, the rotating internal container 11 can provide, around the pin, a suitable ridge to prevent the leakage of food or liquids. Moreover, the ridge can provide a cover to guarantee a better seal of the mixing blade 24.

The fixed mixing device 21 can be anchored to the external container 12 or the lid 18, and advantageously removable.

In another variant embodiment, in accordance with the previous variants, it can be provided that the mixing device 21 rotates together with the internal container 11 with different speeds of rotation and concordant sense of rotation.

In another variant embodiment, in accordance with the previous variants, it can be provided that the mixing device 21 rotates together with the internal container 11 with different speeds of rotation and discordant sense of rotation.

Hereafter we will refer, by way of example, only to the variant embodiment in which the internal container 11 is fixed and the mixing device 21 is rotating.

In this way the mixing blade 24, rotating, imposes a motion of rotation and progressive movement toward the inside and upward to the food contained inside the internal container 11.

The mixing blade 24 can be made to rotate with different ranges of speed, continuously or intermittently.

In another variant embodiment, the rotation of the mixing blade 24 can be anticipated or also postponed with respect to the transmission of the heat, and can be at a constant, variable or intermittent speed.

The mixing blade 24 can be made of plastic material, resistant to high temperatures, for example, but not only, PP or PET or polycarbonate, or of metal material.

Figure 20:
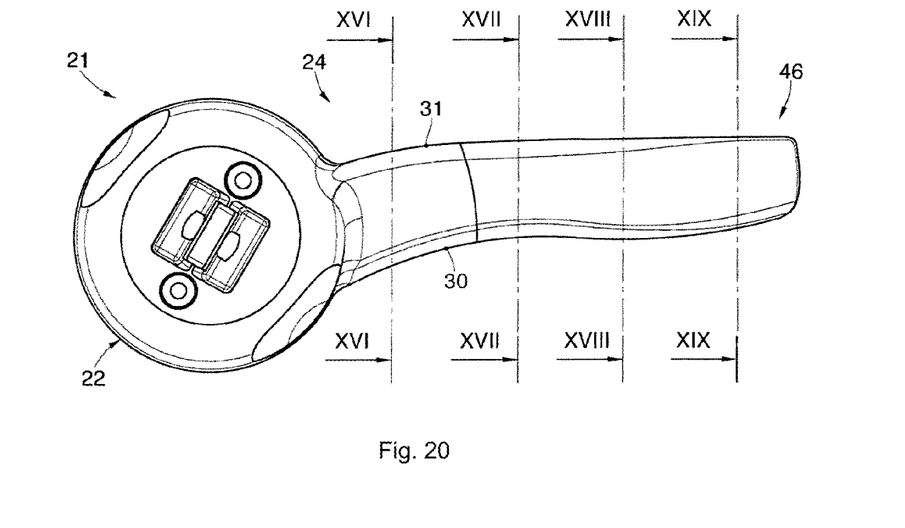
FIG. 20 is a view from above of a mixing device.

In a variant embodiment, also described hereafter with reference to FIG. 20, the mixing blade 24 can be at least partly made of flexible material. For example, the mixing blade 24 can be made of flexible rubber, or similar material, for example in correspondence with its outermost portion facing toward the lateral wall 19 of the internal container 11. Advantageously, a mixing blade 24 made in this way allows to remove residues of food present in the discontinuities of the internal container 11, for example on the perimeter of the base wall 17, or to compensate for variations in size (e.g. oval or parallelepiped) and in the surface of the internal container 11. Furthermore, the flexible material easily adapts to the discontinuity caused by the stirrer element 20 on the lateral wall 19 and further improves the effects of mixing.

According to variant embodiments shown in FIGS. 5-18, combinable with the variant embodiments described here, the mixing blade 24 can be configured to comprise an approach edge 30.

The approach edge 30 is configured to move and lift the foods.

In a particular variant embodiment, in order to obtain the advantages illustrated hereafter, the direction of rotation of the mixing device 21 must cause the food to be hit first by the approach edge 30.

Once the food is lifted by the approach edge 30, it translates with a direction of translation T from the periphery to the center, toward a lifting surface 29.

In a variant embodiment, the lifting surface 29 can be made so that it is not subject to variations in level along its development.

In a particular variant embodiment, the lifting surface 29 can have a slope that is substantially constant along the profile of the mixing blade 24.

In another variant embodiment shown in FIGS. 5-18, the lifting surface 29 can have a slope that varies along the profile of the blade 24.

The mixing blade 24 has a direction of development S that starts from the periphery, adjacent to the lateral wall 19, and continues toward the center, that is, toward the connection mean 22. In this way the lifting surface 29 can be configured so as to increase to a maximum height H (see FIGS. 7, 13, 16, 18).

This development of the mixing blade 24 allows to apply a method for mixing the food, described hereafter, suitable for the apparatus for cooking foods 10.

In a variant embodiment, in accordance with the other variant embodiments, the approach edge 30 can be disposed in a radial direction with respect to the median axis X.

Figures 17, 18:
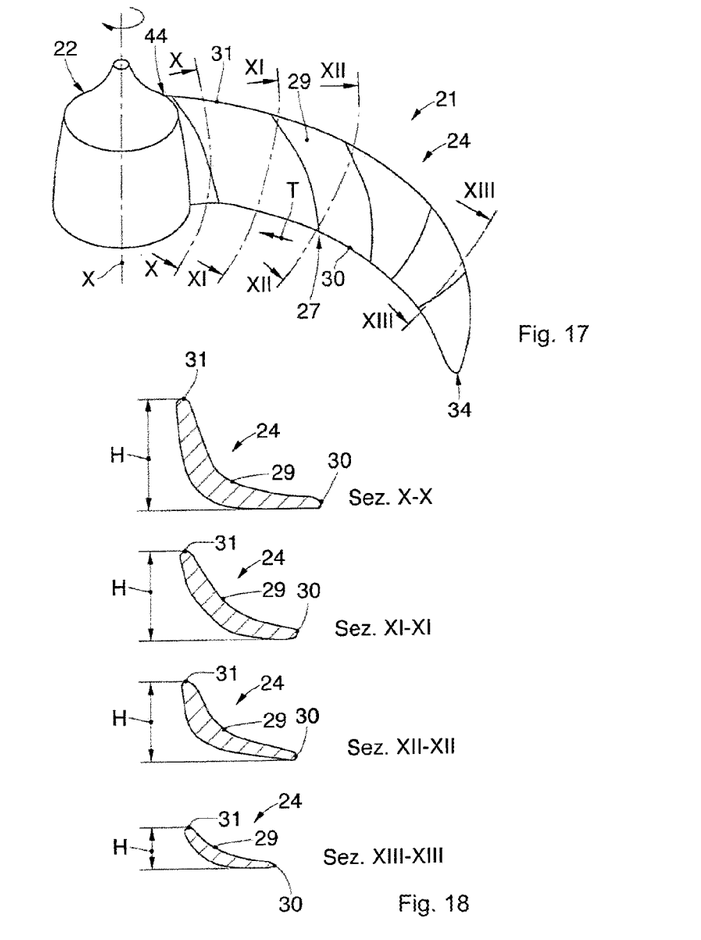
FIG. 17 is a perspective view of a mixing device according to embodiments described here.
FIG. 18 is a lateral view in section of a mixing blade according to embodiments described here.

In another variant embodiment, shown in FIG. 17, the approach edge 30 is configured to include a concavity 27.

Figure 19:
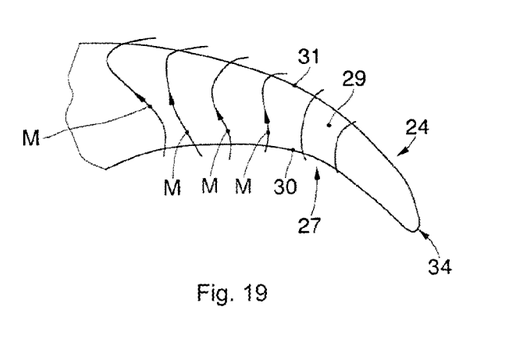
FIG. 19 is a diagram of the direction of migration M.

The concavity 27 is continuous along the whole profile of the approach edge 30 and allows to obtain the progressive movement and lifting of the food from the periphery to the center in a homogeneous manner. In this way a movement M is reproduced, similar to a spiral (FIG. 19). Therefore the translation of the food along the direction of translation T occurs mainly, although not only, thanks to the concavity 27, allowing to collect the food.

The mixing blade 24 can comprise an exit edge 31.

The exit edge 31 can be made by the continuation of the approach edge 30. Moreover, the exit edge 31 and the approach edge 30 together delimit the lifting plane 29.

In a particular variant embodiment, the exit edge 31 can have a substantially constant height H.

In another variant embodiment, shown in FIGS. 5-9, the exit edge 31 can have a progressively and continuously increasing height H from the periphery to the center.

Figure 11:
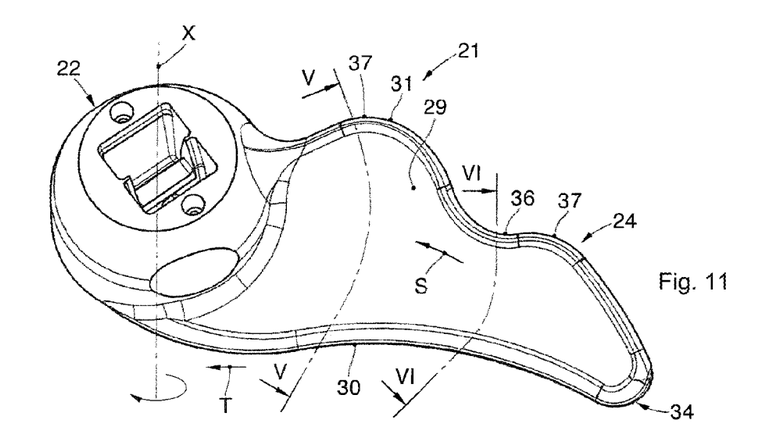
FIG. 11 is a perspective view of a mixing device according to embodiments described here.
Figure 12:
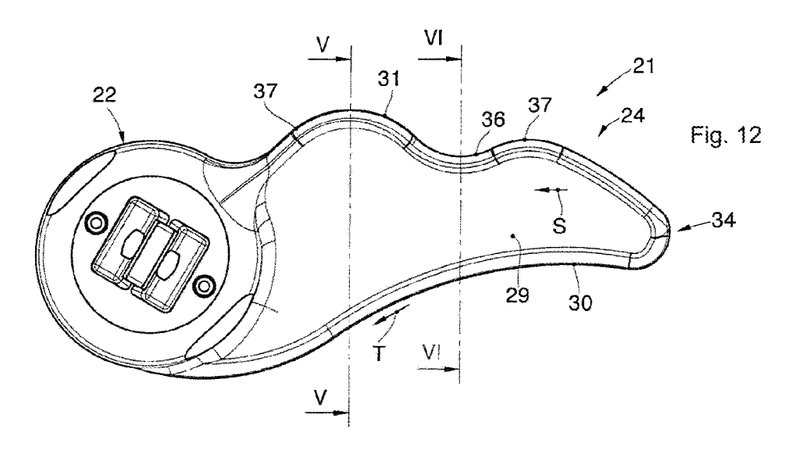
FIG. 12 is a view from above of a mixing device according to embodiments described here.
Figure 13:
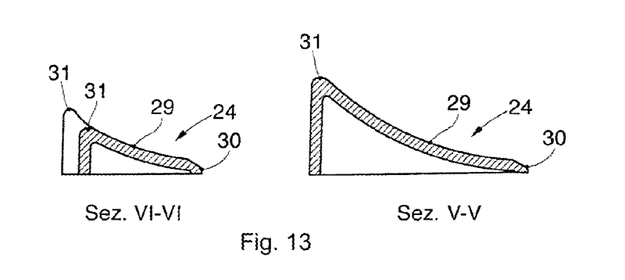
FIG. 13 is a lateral view in section of a mixing blade according to embodiments described here.

In another variant embodiment, shown in FIGS. 11-13, the exit edge 31 can be configured by a succession of concavities 36 and convexities 37. This variant is particularly indicated for granular food, that is, food characterized by little cohesion between the granules which do not form intertwined, thick agglomerates (for example rice or other cereals, or pulses).

Figure 14:
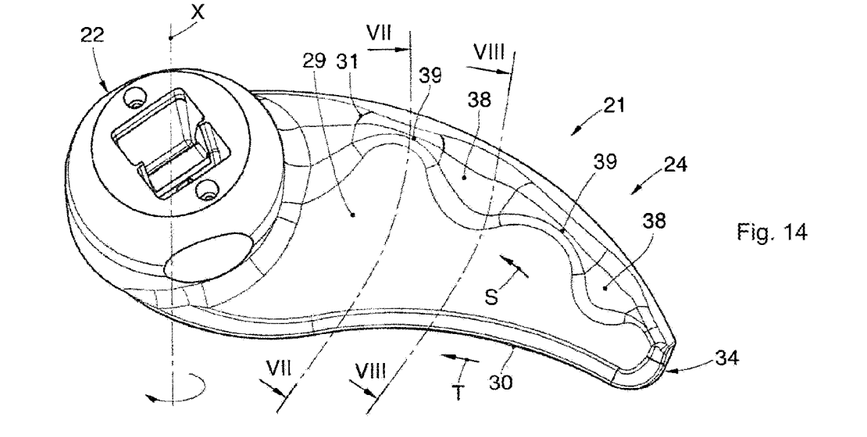
FIG. 14 is a perspective view of a mixing device according to embodiments described here.
Figure 15:
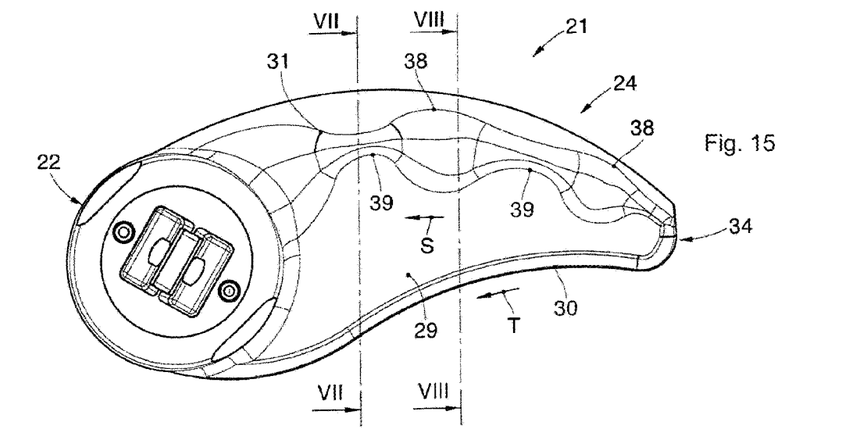
FIG. 15 is a view from above of a mixing device according to embodiments described here.
Figure 16:
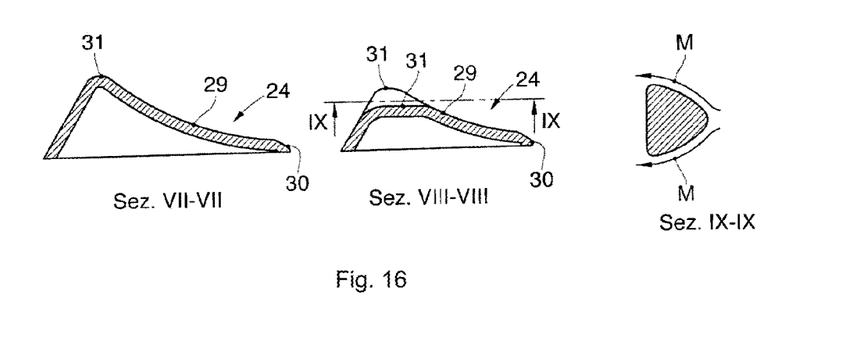
FIG. 16 is a lateral view in section of a mixing blade according to embodiments described here.

In another variant embodiment, shown in FIGS. 14-16, the exit edge 31 has a plurality of depressions 38, at least two, connected to respective ridges or emerging parts 39. In this way, the movement of some foods, such as for example foods characterized by small grains, is facilitated in a migration in direction M (FIG. 16), between the ridges 39 and possibly to oblige the foods to move their circumferential position.

Between the periphery and the longitudinal axis X a radial distance D1 is defined and also a width L, perpendicular to the radial distance D1, able to indicate the width of the mixing blade 24.

The radial distance D1 generally depends on the diameter of the internal container 11 and the stirrer element 20, if it is fixed on the periphery of the internal container 11, to prevent possible impacts. In particular, the distance D1 substantially corresponds to the maximum distance compatible with the size of the base wall 17 of the internal container 11, in order to maximize the mixing efficiency.

As it gradually moves away from the periphery and draws closer to the center, the width L progressively increases. In a preferred formulation, the width L is correlated to the height H by a ratio from 1 time to 3 times. This ratio allows the lifting surface 29 to progressively and gradually increase its inclination, so as to prevent the food from breaking and, on the contrary, to facilitate the lifting thereof.

In a particular embodiment, the ratio between the maximum height H and the distance D1 goes from 0.1 times to 0.5 times.

As shown in FIGS. 17, 18, the lifting surface 29 has an increase in the height H that is not very accentuated toward the periphery, and becomes steeper and steeper toward a terminal part 44 of the mixing blade 24.

The terminal part 44 is disposed in the part nearest the center of the internal container 11.

The terminal part 44 has a development like a turnwrest plowshare to allow the food to pass beyond the exit edge 31 and to overturn, falling back onto the base wall 17 or the bottom of the lid 18.

The collection of the food is promoted by the particular configuration of the mixing blade 24 which also prevents residues of food from adhering on the bottom of the internal container 11.

At any point whatsoever of the lifting surface 29, with the blade rotating, the food is subjected to a movement of translation in direction T, and a movement of migration in direction M.

The migration M makes the food perform a substantially spiral travel from the periphery toward the center of the internal container 11 (FIG. 19).

Figures 8, 9:
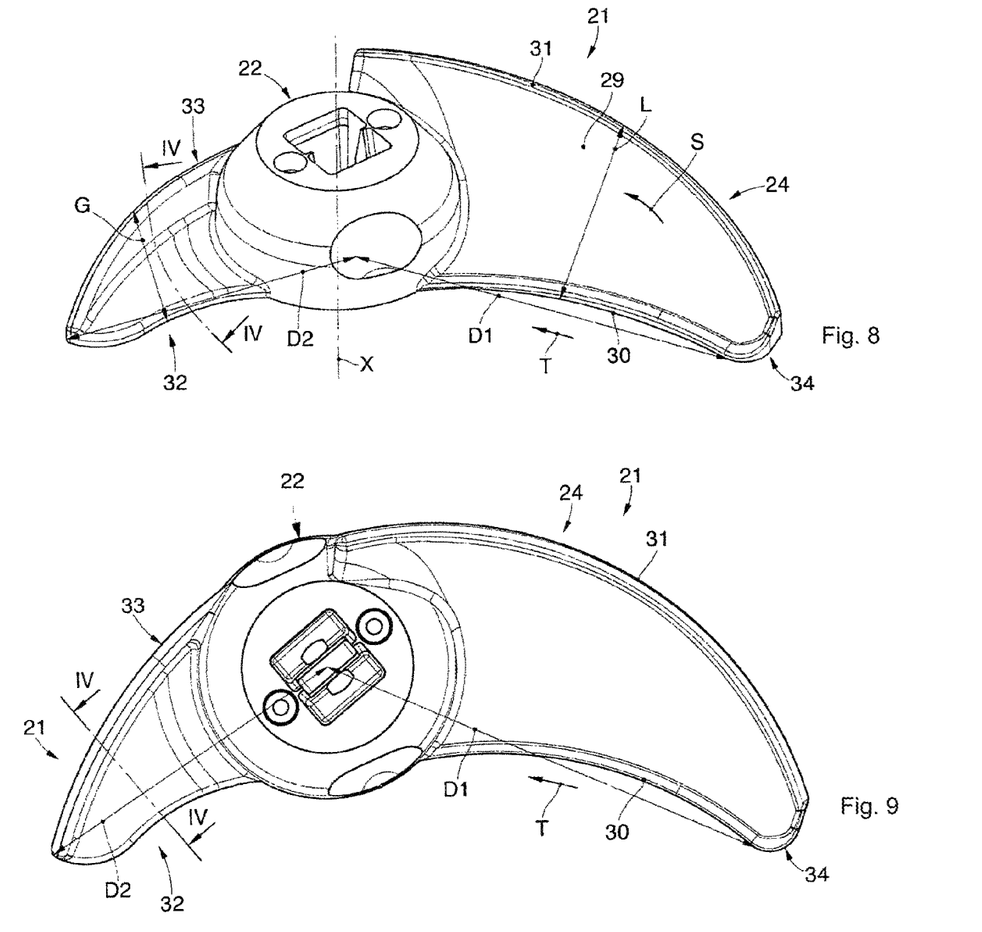
FIG. 8 is a perspective view of a mixing device according to embodiments described here.
FIG. 9 is a view from above of a mixing device according to embodiments described here.
Figure 10:
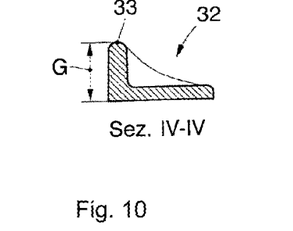
FIG. 10 is a lateral view in section of a mixing blade according to embodiments described here.

According to the variant embodiments in FIGS. 8-10, the mixing device 21 can comprise two blades, in which at least one mixing blade 24 is made according to the variant embodiments described here.

On the contrary, a second blade is defined as distribution blade 32, and can be configured shorter, that is, with a radial distance D2 from 0.2 times to 0.6 times that of the mixing blade 24.

The distribution blade 32 is connected to the connection mean 22 in shared manner with the mixing blade 24, and can be located opposite the mixing blade 24, that is, disposed at an angle for example of about 180°.

The distribution blade 32 can be configured to comprise a contact surface 33 equal to a maximum height G (see FIG. 10). The distribution blade 32 has a development that increases from its end toward the connection mean 22 until it reaches the maximum height G.

The maximum height G goes from 0.45 times to 0.65 times with respect to height H.

In this way the distribution blade 32 allows to redistribute the food on the base wall 17 of the internal container 11, redistributing the agglomerate that is formed immediately after the exit edge 31 has been passed.

Figure 21:
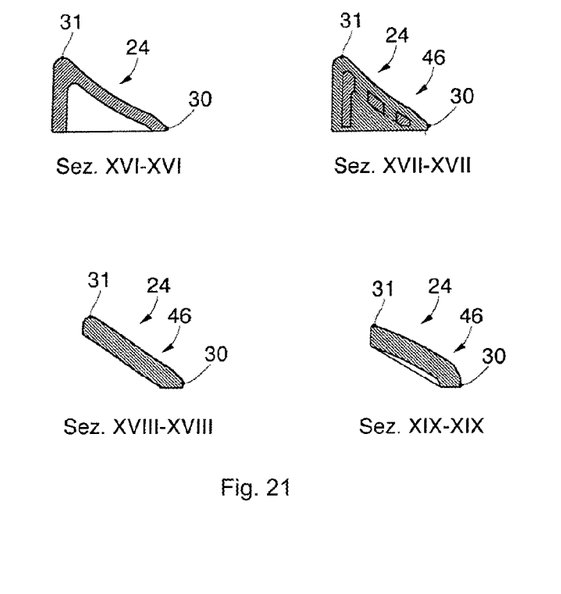
FIG. 21 is a lateral view in section of a mixing device.

In a variant embodiment shown in FIGS. 20 and 21, the mixing blade 24 can include a separator or cleaning element 46, made of flexible material. The separator or cleaning element 46 can constitute the entire mixing portion of the mixing blade 24, and be connected fixedly or removably to the connection mean 22; in the solution shown here, the separator or cleaning element 46 constitutes the external portion of the mixing blade 24 and is connected to a more internal portion, made of more rigid material. In particular, the separator or cleaning element 46 has at least its terminal end made of flexible rubber, or other similar material, in order to clean and remove fragments of food in correspondence with the lateral wall 19.

In another variant embodiment, the separator or cleaning element 46 can coincide with the mixing blade 24. The separator or cleaning element 46 can be made completely of flexible material and can be provided with a core made of more rigid material, to prevent it from bending completely and to guarantee the mixing of the foods.

In a variant embodiment, in particular in its lower edge, a part of the approach edge 30 can also be made of flexible material, to clean the wall and remove fragments of food in correspondence with the base 17. The separator or cleaning element 46 can advantageously remove residues of food present in discontinuities of the internal container 11, or to compensate for variations in size (e.g. oval or parallelepiped) and in the surface of the internal container 11. Furthermore, the flexible material easily adapts to the discontinuity caused by the stirrer element 20 on the lateral wall 19.

As seen in FIG. 21, the exit edge 31 has a development in height that increases progressively from the periphery toward the center of the internal container 11.

According to the variant embodiments described above, a method is also defined for mixing food in an internal container 11 by means of a mixing device 21.

Taking as reference a precise moment in time in which the mixing device 21 is rotating, the food is subjected to:
  a continuous translation T of at least part of the food according to an at least partial migration M on the mixing blade 24 toward the center of the internal container 11;
  a redistribution of said part of the food on the base wall 17 of the internal container 11;
  a lifting of all the food by means of an approach edge 30;
  an at least partial action of upending the food at least in the last quarter of the mixing blade 24 toward the center of the internal container 11 by means of the terminal part 44.

It is clear that modifications and/or additions of parts may be made to the apparatus 10 for cooking foods as described heretofore, without departing from the field and scope of the present invention.

It is also clear that, although the present invention has been described with reference to some specific examples, a person of skill in the art shall certainly be able to achieve many other equivalent forms of apparatus 10 for cooking foods, having the characteristics as set forth in the claims and hence all coming within the field of protection defined thereby.

The invention claimed is:

1. Apparatus for cooking foods, comprising an external container with protective lid of the openable type, an extractable internal container, open at the top and having a base wall and at least one lateral wall, a heating device arranged to transfer heat generated by the heating device toward a surface of the internal container and a mixing device reciprocally mobile with respect to the internal container, wherein said mixing device comprises an extractable mixing blade having a connector positioned to engage a coupling positioned within the internal container, the mixing blade, comprising:
  an approach edge that delimits a lifting surface for at least partly lifting the food;
  wherein said lifting surface is configured to translate at least a part of food in a direction of translation that goes from the periphery, defined by said lateral wall, toward the center of said internal container;
  said lifting surface is conformed to lift the food from said base wall and to move it toward an exit edge delimiting at the rear said lifting surface;
  said exit edge has a shaping such as to cause the at least partial upending of the food, at the same time directing it toward the periphery of the internal container, wherein the exit edge includes an outer segment, an intermediate segment, and an inner segment, and wherein the shaping comprises the outer segment having a first height, the intermediate segment having a second height greater than the first height, and the inner segment having a third height greater than the first height and the second height, and wherein the exit edge progressively and continuously increases in height from the outer segment, the intermediate segment, and the inner segment.

2. Apparatus as in claim 1, further comprising a drive motor, wherein, during operation of the drive motor, the internal container is rotationally fixed and the mixing device is rotatable relative to the internal container about an axis.

3. Apparatus as in claim 1, further comprising a drive motor, wherein, during operation of the drive motor, the internal container is rotatable about an axis relative to the mixing device and the mixing device is rotationally fixed.

4. Apparatus as in claim 1, wherein said mixing blade comprises a peripheral member positioned adjacent the lateral wall and arranged to at least partly scrape said lateral wall.

5. Apparatus as in claim 4, wherein at least part of said peripheral member is made of a flexible material.

6. Apparatus as in claim 1, wherein the mixing blade comprises a rounded terminal portion that cooperates with the lateral wall.

7. Apparatus as in claim 6, wherein the terminal portion is substantially adherent to the lateral wall.

8. Apparatus as in claim 1, wherein the base wall is flat and connected to at least said lateral wall.

9. Apparatus as in claim 1, wherein said approach edge is configured with a straight development.

10. Apparatus as in claim 1, wherein said approach edge is configured with a curved development.

11. Apparatus as in claim 1, wherein said approach edge is configured with a spiral development.

12. Apparatus as in claim 1, wherein the shaping further comprises the outer segment having a first cross-sectional area, the intermediate segment having a second cross-sectional area greater than the first cross-sectional area, and the inner segment having a third cross-sectional area greater than the first and second cross-sectional areas, and wherein the cross-sectional areas progressively and continuously increase from the outer segment, toward the intermediate segment, and toward the inner segment.

13. Apparatus as in claim 1, wherein the exit edge has at least one concavity and one convexity.

14. Apparatus as in claim 1, wherein the exit edge has a succession of ridges and depressions, connected to each other.

15. Apparatus as in claim 1, wherein said mixing blade has a terminal part toward the exit edge and toward the center of the internal container, said terminal part having a conformation similar to the turnwrest plowshare.

16. Apparatus as in claim 1, wherein that said mixing blade has at least its outermost portion made of a flexible material.

17. Mixing blade for a cooking apparatus having at least an internal container for a food, comprising:
an approach edge that delimits a lifting surface to at least partly lift the food;
wherein said lifting surface is configured to translate at least a part of the food in a direction of translation that goes from a periphery, defined by a lateral wall, toward a center of the internal container;
said lifting surface is conformed to lift the food from a base wall and move it toward an exit edge delimiting at a rear of said lifting surface;
said exit edge, in proximity to the center of the internal container, has a shaping such as to cause at least a partial upending of the food, at the same time directing it toward the periphery of the internal container, and wherein the shaping includes an outer segment of the exit edge having a first height and an inner segment of the exit edge having a second height greater than the first height.

18. Blade as in claim 17, comprising a peripheral member.

19. Blade as in claim 17, comprising a rounded terminal portion.

20. Blade as in claim 17, wherein said approach edge is configured with a straight development.

21. Blade as in claim 17, wherein said approach edge is configured with a curved development.

22. Blade as in claim 17, wherein said approach edge is configured with a spiral development.

23. Blade as in claim 17, wherein said exit edge has a progressively constant development in height from the periphery toward the center of the internal container.

24. Blade as in claim 17, wherein said mixing blade has a first cross-section adjacent the outer segment and gradually progresses to a second and larger cross-section adjacent the inner segment.

25. Blade as in claim 17, wherein the exit edge has a progressively increasing development in height.

26. Blade as in claim 17, wherein the exit edge has at least one concavity and one convexity.

27. Blade as in claim 17, wherein the exit edge has a succession of ridges and depressions, connected to each other.

28. Blade as in claim 17, comprising a terminal part toward the exit edge and toward the center of the internal container, said terminal part having a conformation similar to the turnwrest plowshare.

29. Blade as in claim 17, wherein at least its outermost portion is made of a flexible material.

30. Method to mix foods including providing foods within a cooking apparatus as in any claim hereinbefore, inside an internal container having a base wall, in which a mixing device is reciprocally mobile with respect to the internal container, said mixing device comprising at least a mixing blade and a connection mean, wherein the mixing device carries out, in sequence:
a continuous translation of at least part of the food according to an at least partial migration on the mixing blade toward the center of the internal container;
a redistribution of said part of the food on the base wall of the internal container;
a lifting of all the food by means of an approach edge;
an at least partial action of upending the food at least in the last quarter of the mixing blade toward the center of the internal container.

* * * * *